US011340410B2

(12) United States Patent
Leigh et al.

(10) Patent No.: US 11,340,410 B2
(45) Date of Patent: May 24, 2022

(54) DIMENSIONALLY ALL-TO-ALL CONNECTED NETWORK SYSTEM USING PHOTONIC CROSSBARS AND QUAD-NODE-LOOP ROUTING

(71) Applicant: HEWLETT PACKARD ENTERPRISE DEVELOPMENT LP, Houston, TX (US)

(72) Inventors: Kevin B. Leigh, Houston, TX (US); Luca Ramini, Cernusco sul Naviglio (IT); Mir Ashkan Seyedi, Milpitas, CA (US); Marco Fiorentino, Milpitas, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 17/074,472

(22) Filed: Oct. 19, 2020

(65) Prior Publication Data

US 2022/0120983 A1    Apr. 21, 2022

(51) Int. Cl.
*G02B 6/42*    (2006.01)
*G02B 6/293*    (2006.01)
(Continued)

(52) U.S. Cl.
CPC ....... *G02B 6/4215* (2013.01); *G02B 6/29343* (2013.01); *H04B 10/801* (2013.01);
(Continued)

(58) Field of Classification Search
CPC .............. G02B 6/4215; G02B 6/29343; H04Q 2011/0058; H04B 10/801
See application file for complete search history.

(56) References Cited

U.S. PATENT DOCUMENTS

| 6,411,752 B1 * | 6/2002 | Little ................. G02B 6/12002 |
| | | 385/17 |
| 6,674,558 B1 | 1/2004 | Chang et al. |

(Continued)

FOREIGN PATENT DOCUMENTS

| CN | 102882601 B | 4/2015 |
| CN | 106533993 B | 4/2019 |

(Continued)

OTHER PUBLICATIONS

Li, C., Bai, R., Shafik, A., Tabasy, E. Z., Wang, B., Tang, G., . . . Palermo, S. (2014). Silicon photonic transceiver circuits with microring resonator bias-based wavelength stabilization in 65 nm CMOS. IEEE Journal of Solid-State Circuits, 49(6), 1419-1436. doi:http://dx.doi.org/10.1109/JSSC.2014.2321574(2014).*

(Continued)

*Primary Examiner* — Leslie C Pascal
(74) *Attorney, Agent, or Firm* — Hewlett Packard Enterprise Patent Department

(57) ABSTRACT

An photonic circuit includes a substrate, a plurality of first light waveguides disposed on the substrate, the first light waveguides extending in a first direction, a plurality of second light waveguides disposed on the substrate and extending in a second direction intersecting the first direction, and a plurality of first micro-ring resonators disposed on the substrate. Each of the first light waveguides has an intersection with each of the second light waveguides. Each of the intersections is provided with a first micro-ring resonator of the first micro-ring resonators. Each first micro-ring resonator is configured to route signals of a respective wavelength from one of the light waveguides at the intersection to another light waveguide at the intersection.

18 Claims, 7 Drawing Sheets

(51) Int. Cl.
  *H04B 10/80* (2013.01)
  *H04Q 11/00* (2006.01)
(52) U.S. Cl.
  CPC ........... *H04Q 2011/0009* (2013.01); *H04Q 2011/0058* (2013.01)

(56) References Cited

U.S. PATENT DOCUMENTS

| | | | |
|---|---|---|---|
| 6,892,032 | B2 | 5/2005 | Milton et al. |
| 7,130,540 | B2 | 10/2006 | Simmons et al. |
| 7,716,271 | B1 | 5/2010 | Bertsekas et al. |
| 8,335,434 | B2 | 12/2012 | Beausoleil et al. |
| 9,229,163 | B2 | 1/2016 | Schwetman et al. |
| 9,316,784 | B2 | 4/2016 | Krishnamoorthy et al. |
| 9,621,273 | B2 | 4/2017 | Nagarajan |
| 9,693,124 | B2 | 6/2017 | Robinson et al. |
| 9,893,950 | B2 | 2/2018 | Chen et al. |
| 10,564,512 | B2 | 2/2020 | Sun et al. |
| 2003/0016411 | A1 | 1/2003 | Zhou et al. |
| 2003/0128980 | A1* | 7/2003 | Abeles ............ H04B 10/25756 398/48 |
| 2009/0110348 | A1* | 4/2009 | Bratkovski ............ G02F 1/095 385/16 |
| 2012/0082454 | A1 | 4/2012 | Ooi |
| 2012/0237155 | A1 | 9/2012 | Zheng et al. |
| 2014/0044015 | A1 | 2/2014 | Chen et al. |
| 2015/0163570 | A1 | 6/2015 | Zid et al. |
| 2015/0168803 | A1* | 6/2015 | Xu ..................... G02F 1/353 359/332 |
| 2015/0309265 | A1 | 10/2015 | Mehrvar et al. |
| 2017/0223437 | A1 | 8/2017 | Lee et al. |
| 2018/0217328 | A1 | 8/2018 | Heroux et al. |
| 2018/0217344 | A1 | 8/2018 | Fini et al. |
| 2018/0287818 | A1 | 10/2018 | Goel et al. |
| 2019/0089461 | A1 | 3/2019 | Sun et al. |
| 2020/0287627 | A1 | 9/2020 | Johnson |

FOREIGN PATENT DOCUMENTS

| | | |
|---|---|---|
| CN | 110012368 A | 7/2019 |
| EP | 1271827 A1 | 1/2003 |

OTHER PUBLICATIONS

Binetti et al., "Indium Phosphide Photonic Integrated Circuits for Coherent Optical Links", IEEE Journal of Quantum Electronics, vol. 48(2), Feb. 2012, pp. 279-291.

Buex et al., "Optical Ring Network-on-Chip (ORNoC): Architecture and Design Methodology," Date'11: Conference on Design, Automation and Test in Europe, Sep. 2, 2011, 7 pages.

Cheng et al., "Recent Advances in Optical Technologies for Data Centers: A Review", Optical Society of America, vol. 5, No. 11, Nov. 2018, pp. 1354-1370.

Cheng et al., "Photonic switching in high performance datacenters [Invited]", Optics Express 16022, vol. 26(12), Jun. 8, 2018, 22 pages.

Cheng et al., "Ultralow-crosstalk, strictly non-blocking microring-based optical switch", Photonics Research, Chinese Laser Press, vol. 7(2), Jan. 16, 2019, pp. 155-161.

Mansoor et al., "Review of Progress in Optical Ring Resonators with Crosstalk Modelling in OADMS", Research Gate, Oct. 2015, 11 pages.

Proietti et al., "Self-driving Reconfigurable Silicon Photonic Interconnects (Flex-LIONS) with Deep Reinforcement Learning", SC19, Nov. 2019, 3 pages.

Yu et al., "A scalable silicon photonic chip-scale optical switch for high performance computing systems", Optics Express, vol. 21(23), Dec. 24, 2013, 13 pages.

Zhu et al., "Fully programmable and scalable optical switching fabric for petabyte data center", Optics Express, vol. 23(3), Feb. 5, 2015, 18 pages.

\* cited by examiner

US 11,340,410 B2

DIMENSIONALLY ALL-TO-ALL CONNECTED NETWORK SYSTEM USING PHOTONIC CROSSBARS AND QUAD-NODE-LOOP ROUTING

STATEMENT OF GOVERNMENT RIGHTS

This invention was made with Government support under Agreement Number H98230-19-3-0002. The Government has certain rights in the invention.

DESCRIPTION OF RELATED ART

There are many interconnect fabric topologies based on either packet switches or optical circuit switches where either high-power and/or expensive switches are needed for a wide range of bandwidth, latency and scalability metrics. In an All-to-All connected system, a group of local nodes are connected to one or more external groups of nodes. Such a system is desirable for high performance computing. "Statement of Government Rights"—This invention was made with Government support under Agreement Number H98230-19-3-0002. The Government has certain rights in the invention."

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

As optical interconnects are increasingly implemented within communication networks, including serving as the fabric for HPC implementations, latency is further increased due to the need for optical to electrical conversions. Optical communications provide higher bandwidth potential over traditional electrical cabling and can transmit signals effectively over longer distances. However, the data must be converted into the electrical domain in order for the processors of the node to use the received data. Not only must the optical data be converted into the electrical domain for the processor to interpret, if the data is meant for a different endpoint or node the data must be converted back into the optical domain for transmission. This increases the latency in message response.

Techniques disclosed herein reduce cost by eliminating the use of expensive switches and needing 20% fibers, compared to traditional packet switches and optical circuit switches where their ports are fully connected all-to-all with optical cables. The techniques employ photonic crossbar (PXB) to reduce optical connectors and chip counts compared to similar method that uses single-wavelength light source for local links. Various embodiments reduce end-to-end latency by routing messages only in optical domain between two ports even the messages traverse via photonic passthrough nodes as will be explained hereinafter, requiring no optical-electrical-optical conversion, no data buffering, and no message congestion that stalls in data buffers. A targeted benefit is high bandwidth enabled by scaling the numbers of electrical lanes in nodes (limited by processor designs) and corresponding numbers of wavelengths for each message path. The number of lanes and wavelengths can be scaled up by fanning out lanes in each node.

Various embodiments describe a network system using high order or WDM signals and on-chip photonic crossbars along with dimensionally all-to-all connected fabric topologies to interconnect hundreds or thousands of nodes, to enable terabits per second (Tbps) bandwidth with low latency due to directly-connected nodes. Wavelength assignments are chosen to allow a node to connect to its direct neighbor nodes within or across groups, or to indirectly-connected remote neighbor nodes in other groups by "passing through" photonic crossbars in directly-connected neighbor nodes. On some embodiments, optical cables described in the embodiments may comprise single-mode fibers having small fiber core diameter, e.g., 9 µm. In other examples, an optical cable may comprise larger core diameter fibers, e.g., multimode fibers, e.g., 50 µm, where lowest-order mode may be used. In yet other examples, other fiber types may be used. Regardless, appropriate optical connectors may be used to mode match with the optical fibers used in optical cables.

Figure 1:
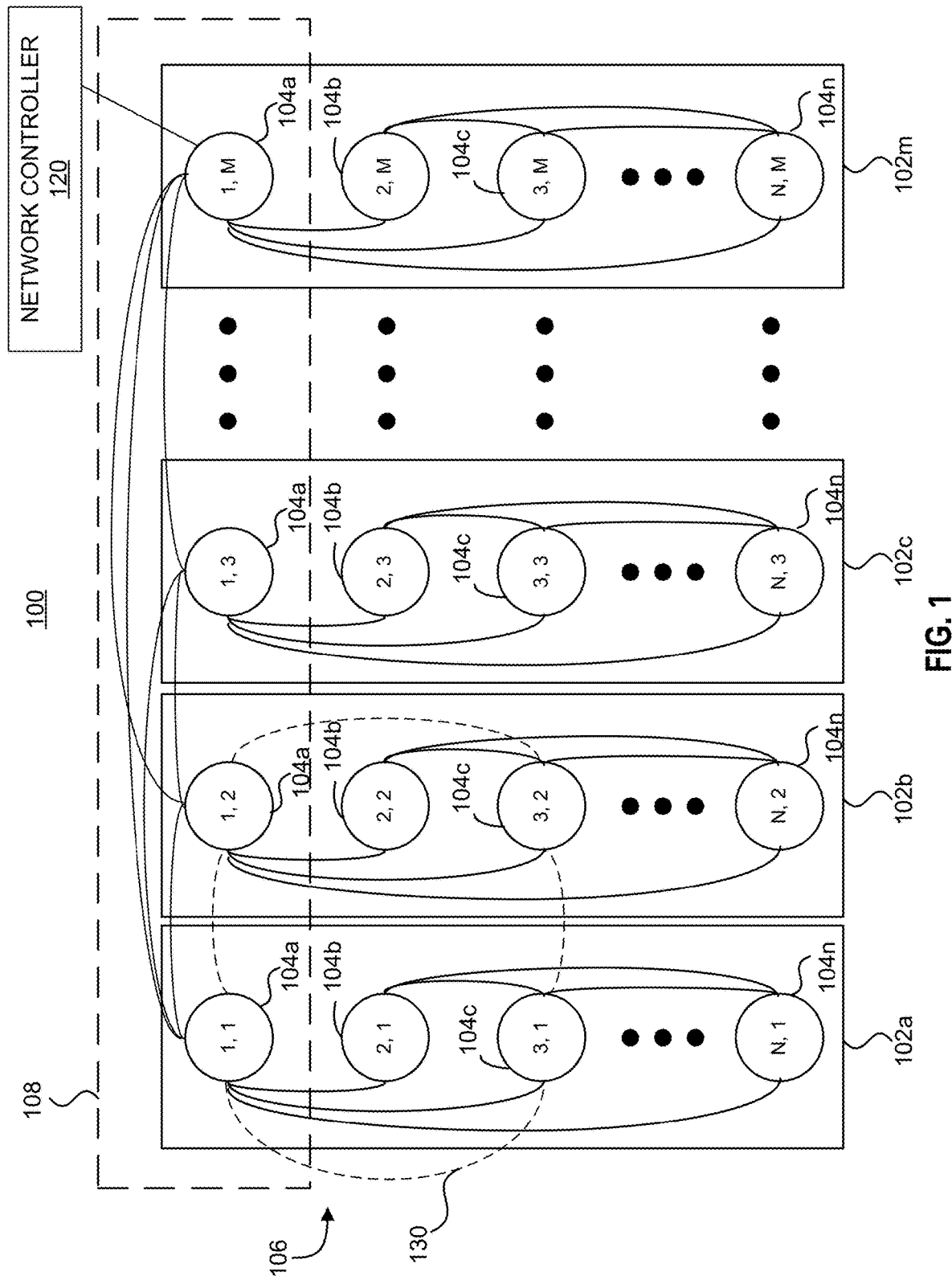
FIG. 1 illustrates an example network within which embodiments of the technology disclosed herein can be implemented

FIG. 1 illustrates an example network 100 within which embodiments of the technologies disclosed herein can be implemented. The example network 100 is provided for illustrative purposes only and should not limit the scope of the technologies to only the depicted embodiment. For ease of discussion, the network 100 is depicted as a high-performance computing (HPC) system, but the technology is not limited to only HPC systems or environments. The technologies of the present disclosure is applicable to any network or system in which data is transmitted over an optical interconnect. As shown in FIG. 1, the network 100 can comprise a plurality of groups 102a-m (generally, "the group 102," collectively, "the groups 102."). Each group 102 comprises a plurality of nodes 104a-n (generally, "the node 104," collectively, "the nodes 104."). In FIG. 1, the group 102a includes nodes 104 denoted as (1, 1), (2, 1), (3, 1) . . . (N, 1); group 102b includes nodes 104 denoted as (1, 2), (2, 2), (3, 2) . . . (N, 2); group 102c includes nodes 104 denoted as (1, 3), (2, 3), (3, 3) . . . (N, 3); and group 102n includes nodes 104 denoted as (1, M), (2, M), (3, M) . . . (N, M). In FIG. 1, the node is labeled as (x, y) where x presents a node number in the group while y presents its group number. Other types node labeling are contemplated. Each of the nodes 104 may be a computing nodes that uses a photonic node to interface to the network 100.

In various embodiments, the nodes 104 can comprise servers or other computing devices including one or more processors. In various embodiments, each group 102 can comprise the same number of nodes 104. In various embodiments, the groups 102 may be co-located in the same location (e.g., the same data center, the same rack within a data center).

Each node 104 can include a photonics interface system (as illustrated and described in more detail below with respect to FIGS. 2-4, 5A, and 5B) configured to enable the node 104 to transmit and receive optical signals from other nodes 104 within the network 100. Each of the nodes 104 within each group 102 can be directly connected over an optical fiber to each of the other nodes 104 within the same group 102. The photonic interface system of each node 104 can also be directly connected to at least one node of every other different group 102 over an optical interconnect fabric 106. In FIG. 1 each line between groups represents the at least one direct connection from a node 104 of a first group 102 to a node 104 of a second group different from the first group within the network 100.

In various embodiments, each of the nodes 104 in the network 100 can include a network controller 120. The network controller 120 can be configured to manage the operation of the nodes 104 within the network 100.

The nodes 104 in the network 100 are dimensionally All-to-All connected to each other. The nodes 104 in the same group 102 are all-to-all connected to each other with direct local links in a first dimension (e.g., vertically in network 100). Each connected local link is between two ports of the nodes 104 having the same wavelength for direct communications. In addition, the nodes in the same row (e.g., 108) belonging to different groups are all-to-all connected to each other with direct global links in a second dimension (e.g., horizontally in the network 100). As can be appreciated, the vertical and horizontal dimensions illustrated in FIG. 1 are provided as a non-limiting example. Different network topologies may invoke different dimensions.

Any two nodes 104 in a first group 102 and corresponding two nodes 104 in a second group 102 in the same rows as the two nodes 104 in the first group 102 may form a quad-node loop (QNL). For example, referring to FIG. 1, a QNL 130 includes the nodes (1, 1) and (3, 1) of the group 102a and the nodes (1, 2) and (3, 2) of the group 102b (connected in dash lines). For description purpose, intragroup communications between nodes 104 in the same group 102 are referred to as local communications, while intergroup communications between nodes 104 in the different groups 102 are called global communications. In one QNL, nodes from the same group are called "local neighbors (or local neighbor nodes)," while nodes from different groups connected by a direct link are called "global twins (or global twin nodes)." In the QNL 130, the nodes (1, 1) and (3, 1) of the group 102a are a pair of local neighbors; the nodes (1, 2) and (3, 2) of the group 102b are another pair of local neighbors. The Intergroup nodes (3, 1) and (3, 2) are a pair of global twins, and the nodes (1, 1) and (1, 2) are another pair of global twins.

In some embodiments, communications/signals within one QNL may be transmitted either clockwise or counterclockwise. In some embodiments, depending on system setup, communications/signals within one QNL can only be clockwise or counterclockwise system-wise. For example, in QNL 130, when the node (1, 1) in the group 102a desires to send a signal to the node (3, 2) in the group 102b, the signal is transmitted from the node (1, 1) to its local neighbor node (3, 1), and then from the node (3, 1) to its global twin node (3, 2). In this example, node (3, 1) is a pass-through node as the signal goes through it without being extracted or converted. In another instance, the signal can be transmitted from the node (1, 1) to its global twin node (1, 2), and then from the node (1, 2) to its local neighbor node (3, 2). In this example, node (1, 2) is a pass-through node.

Figure 2:
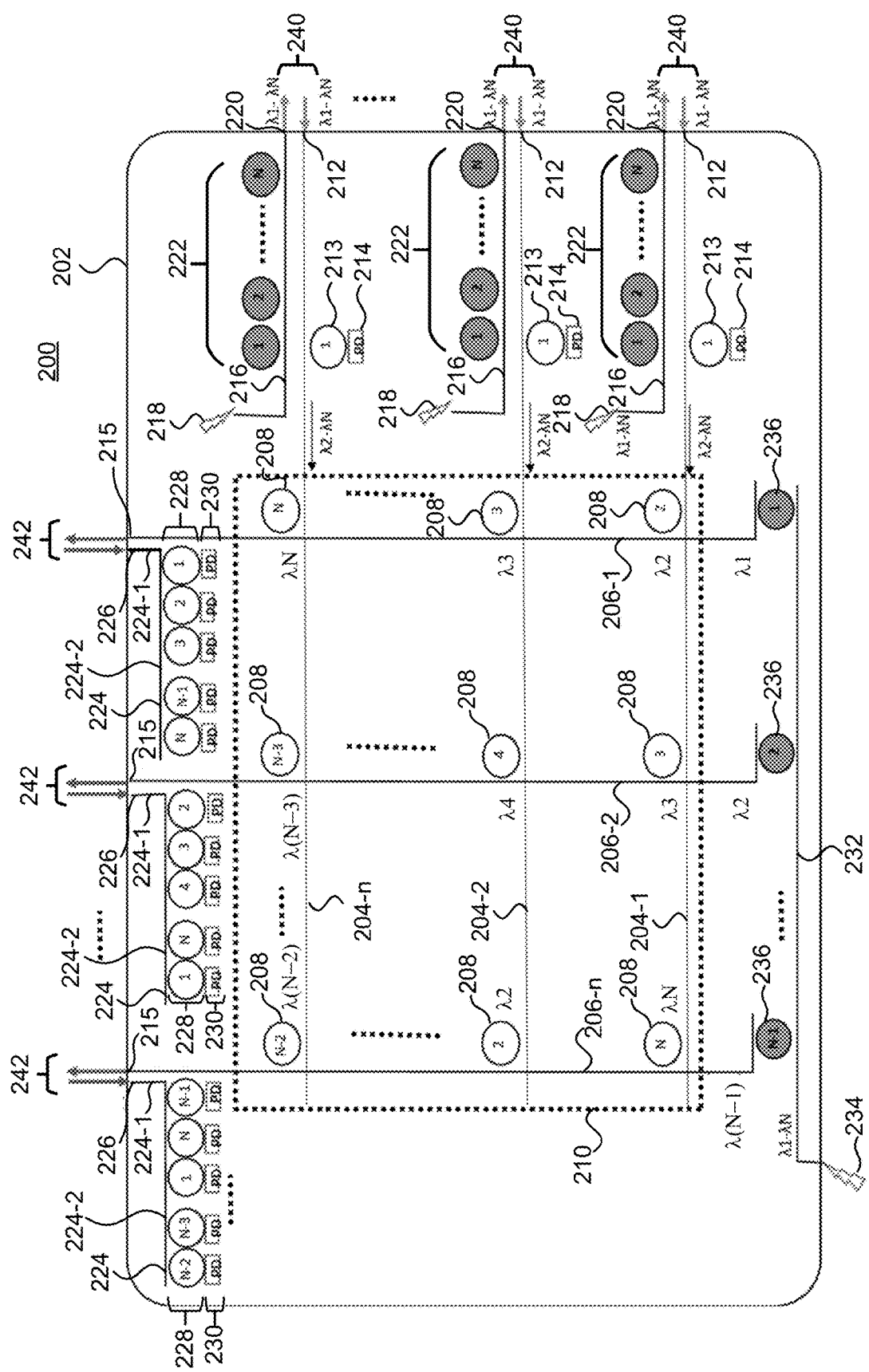
FIG. 2 illustrates a photonic circuit consistent with various embodiments of this disclosure.

To implement the communications in network 100, each of the nodes 104 in the network 100 is equipped with a photonic circuit (e.g., photonic node). Reference is now made to FIG. 2. FIG. 2 illustrates a photonic circuit 200 consistent with various embodiments of this disclosure. The photonic circuit 200 includes a substrate 202, a plurality of global-receive waveguides 204-1, 204-2, . . . , 204-n (generally, "the global-receive waveguide 204," collectively, "the global-receive waveguides 204") disposed on the substrate 202, and a plurality of local-transmit waveguides 206-1, 206-2, . . . , 206-n (generally, "the local-transmit waveguide 206," collectively, "the local-transmit waveguides 206") disposed on the substrate 202. The global-receive waveguides 204 are extended in a first direction (e.g., the horizontal direction in FIG. 2). The local-transmit waveguides 206 are extended in a second direction (e.g., the vertical direction in FIG. 2). The first direction is different from the second direction such that each of the global-receive waveguides 204 has an intersection with each of the local-transmit waveguides 206. In some embodiments, the first direction and the second direction are orthogonal to each other. In some embodiments, the global-receive waveguides 204 and the local-transmit waveguides 206 may be correlated to each other in other configurations. For example, the local-transmit waveguides 206 may include a section in parallel with the global-receive waveguides 204 as long as signals on the global-receive waveguides 204 can be dropped to the local-transmit waveguides 206.

The photonic circuit 200 further includes a plurality of micro-ring resonators 208 disposed on the substrate 202. Each of the intersections between the global-receive waveguides 204 and the local-transmit waveguides 206 is provided with a micro-ring resonator 208. Each micro-ring resonator 208 is configured to route/redirect signals of a respective wavelength from one of the global-receive waveguides 204 at the intersection to one of the local-transmit waveguides 206 at the intersection. That is, a wavelength is dropped by a micro-ring resonator from one waveguide to another for redirecting/rerouting in a PXB in a passthrough node. Each of micro-ring resonator 208 corresponding to the same global-receive waveguide 204 is configured to route a different wavelength. Also, each of micro-ring resonator 208 corresponding to the same local-transmit waveguide 206 is configured to route a different wavelength. For example, the micro-ring resonators 208 corresponding to the global-receive waveguide 204-1 are configured to route different wavelengths indicated by different wavelengths $\lambda 2$ to $\lambda N$. Similarly, the micro-ring resonators 208 corresponding to the local-transmit waveguide 206-1 are configured to route different wavelengths indicated by different wavelengths $\lambda 2$ to $\lambda N$. As shown in FIG. 2, each the global-receive waveguides 204 and the local-transmit waveguides 206 is capable to guide multiple wavelengths.

The signals on each global-receive waveguide 204 are de-multiplexed as different wavelengths of signals are dropped at staggered micro-ring resonators 208 at the intersections. For example, $\lambda 2$ is dropped from the global-receive waveguide 204-1 to the local-transmit waveguide 206-1 by the micro-ring resonator 208 labeled by "2". Similarly, $\lambda 3$ is dropped from the global-receive waveguide 204-1 to the local-transmit waveguide 206-2 by the micro-ring resonator 208 labeled by "3" adjacent to the global-receive waveguide 204-1, and $\lambda N$ is dropped from the global-receive waveguide 204-1 to the local-transmit waveguide 206-$n$ by the micro-ring resonator 208 labeled by "n" adjacent to the global-receive waveguide 204-1. The signals on each local-transmit waveguide 206 are multiplexed as different wavelengths of signals are routed thereto by staggered micro-ring resonators 208 at the intersections. For example, $\lambda 2$ is routed from the global-receive waveguide 204-1 to the local-transmit waveguide 206-1 by the micro-ring resonator 208 labeled by "2". Similarly, $\lambda 3$ is routed from the global-receive waveguide 204-2 to the local-transmit waveguide 206-1 by the micro-ring resonator 208 labeled by "3" adjacent to the local-transmit waveguide 206-1, and $\lambda N$ is routed from the global-receive waveguide 204-$n$ to the local-transmit waveguide 206-1 by the micro-ring resonator 208 labeled by "n" adjacent to the local-transmit waveguide 206-1.

The global-receive waveguides 204, the local-transmit waveguides 206, and the micro-ring resonators 208 form a photonic crossbar (PXB) 210 as they can route/redirect signals (transmitted with different wavelengths $\lambda 2$-$\lambda N$) received at the global-receive waveguides 204 to the local-transmit waveguides 206 and be sent to local neighbor nodes.

Each of the global-receive waveguides 204 is coupled to a global input port 212, which is connected to a global twin node of an external group. The photonic circuit 200 further includes a plurality of global-receive micro-ring resonators 213 each coupled to a global-receive waveguide 204. The global-receive micro-ring resonators 213 are configured to extract signals transmitted in a specific wavelength (e.g., wavelength $\lambda 1$) for the local node that has the photonic circuit 200. These signals are called global direct signals as they are signals from the global twin node addressed to the local node. Each of the global-receive micro-ring resonators 213 is coupled to a photodetector (PD) 214. Each of the photodetectors 214 is configured to convert light signals extracted by the global-receive micro-ring resonators 213 into electrical signals for the local node.

Each of the local-transmit waveguides 206 is coupled to a local output port 215 that is connected to a local neighbor node of the local group. Signals of different wavelengths from a local-transmit waveguide 206 may be multiplexed before being sent out to a local neighbor node from a local output port 215.

When a global input port 212 receives light signals from a global twin node, the signals destined for the local node (e.g., having wavelength $\lambda 1$) is picked up by a global-receive micro-ring resonator 213. The rest of the signals (i.e., pass-through signals having wavelengths $\lambda 2$-$\lambda N$) are guided by a global-receive waveguide (e.g., 204-1) to the micro-ring resonators 208 (e.g., functioned as microring filters for pass-through signals (MRF)) corresponding to the global-receive waveguide 204-1. Each of those micro-ring resonators 208 routes/redirects the pass-through signals of a particular wavelength (e.g., $\lambda 2$, $\lambda 3$, . . . , or $\lambda N$) to a corresponding local-transmit waveguide (e.g., 206-1, 206-2, or 206-$n$). This local-transmit waveguide 206-1 guides the pass-through signals from all or some of the global-receive waveguides 204-1-204-$n$ to a local output port 215 to be transmitted to a local neighbor node.

The photonic circuit 200 further includes a plurality of global-transmit waveguides 216 disposed on the substrate 202. In some embodiments, the global-transmit waveguides 216 are in parallel with the global-receive waveguides 204. That is, the global-transmit waveguides 216 are extended in the same direction as the global-receive waveguides 204. Each of the global-transmit waveguides 216 is coupled to a global light source 218 at one end portion of the global-transmit waveguides 216 and to a global output port 220 at another end portion of the global-transmit waveguides 216. A plurality of global output light modulators 222 are disposed on the substrate and adjacent to each of the global-transmit waveguides 216. Each of the global output light modulators 222 is configured to modulate a different wavelength (denoted as 1, 2, . . . , N representing different wavelengths $\lambda 1, \lambda 2, \ldots, \lambda N$). In some embodiments, global output light modulators 222 are microring modulators for transmit (MRM). The global light sources 218 may include any light-emitting devices, such as lasers. In some embodiments, the global light sources 218 may be comb lasers that each can emit multiple different wavelengths of light into the global-transmit waveguides 216. While transit on a global-transmit waveguide 216, the multiple different wavelengths of light from the global light source 218 are modulated by the global output light modulators 222 to generate light signals to be transmitted to a global twin node. The global output ports 220 and the global input ports 212 may be disposed on the same side of the photonic circuit 200 to facilitate connection to global twin nodes through one or more optical cables and connectors. In some embodiments, the global light source 218 may be a comb laser or alternatively may be a plurality of single-wavelength lasers with outputs multiplexed on the single waveguide 216.

The photonic circuit 200 further includes a plurality of local-receive waveguides 224 disposed on the substrate 202. As a non-limiting example, each of the local-receive waveguides 224 has a first portion 224-1 and a second portion 224-2. The first portion 224-1 is in parallel to the local-transmit waveguides 206. The second portion 224-2 is in parallel to the global-receive waveguides 204. Other arrangements of the local-receive waveguides 224 are possible. For example, each of the local-receive waveguides 224 may be in a shape of a straight line or a wavy line. Each of the first portion 224-1 is coupled to a local input port 226 that is connected to a local neighbor node. The local output ports 215 and the local input ports 226 may be disposed on the same side of the photonic circuit 200 to facilitate connection to local neighbor nodes through one or more optical cables and connectors.

A plurality of local-receive micro-ring resonators 228 are disposed on the substrate 202 and adjacent to each of the second portions 224-2 of the local-receive waveguides 224. Each of the local-receive micro-ring resonators 228 is configured to extract a different wavelength. Each of the local-receive micro-ring resonators 228 is coupled to a photodetector (PD) 230. Each of the photodetectors 230 is configured to convert light signals extracted by a corresponding local-receive micro-ring resonator 228 into electrical signals for the local node.

The photonic circuit 200 further includes another waveguide 232 extending in the same direction as the global-receive waveguides 204. The waveguide 232 is disposed adjacent to ends of the local-transmit waveguides 206 opposite to the local output ports 215. A local light source 234 is coupled to an end of the waveguide 232. The local light source 234 may include any light-emitting devices, such as lasers. In some embodiments, the local light source 234 may be a comb laser that can emit multiple different wavelengths of light into the waveguide 232. The photonic circuit 200 further includes a plurality of local output light modulators 236, each disposed between an end of a respective local-transmit waveguide 206 and the waveguide 232. Each of the local output light modulators 236 is configured to modulate a different wavelength (denoted as 1, 2, ..., N−1 representing different wavelengths λ1, λ2, ..., λN−1).

When the local node (e.g., node (1, 1) of FIG. 1) that has the photonic circuit 200 initiates communications with local neighbor nodes (e.g., nodes (2, 1), (3, 1) ... (N, 1) of FIG. 1), the local light source 234 is controlled to emit light to the waveguide 232. The light is then modulated by the local output light modulators 236 to generate light signals and routed to respective local-transmit waveguides 206. These light signals may be multiplexed with pass-through signals destinated for the local neighbor nodes from the global-receive waveguides 204 and are output from the local output ports 215 to the local neighbor nodes. A local output light modulator 236 for a respective local-transmit waveguide 206 is configured to modulate a light signal of a wavelength different from wavelengths of light signals redirected by all other micro-ring resonators 208 corresponding to the respective local-transmit waveguide 206. For example, the local output light modulator 236 for the local-transmit waveguide 206-1 is configured to modulate a light signal of wavelength λ1, which is different from wavelengths λ2, λ3, ..., λN of light signals redirected by the micro-ring resonators 208 corresponding to the local-transmit waveguide 206-1.

For global direct communications from nodes of external groups to the local node, such as communications between the nodes in the same row in FIG. 1, one particular wavelength is assigned for the local node. As a non-limiting example, referring to FIGS. 1 and 2, the local node (e.g., node (1, 1)) uses λ1 for global direct communications with the local node's global twin nodes (e.g., nodes (1, 2), (1, 3), (1, M)). Because of this assignment, the global-receive micro-ring resonators 213 coupled to the global-receive waveguides 204 are configured to extract light signals of λ1 for the local node (e.g., node (1, 1)). Pass-through signals (e.g., λ2-λN) destined for (N−1) local neighbor nodes (e.g., nodes (2, 1), (3, 1), (N, 1)) are assigned different wavelengths than λ1 and are routed/redirected by the micro-ring resonators 208 to the local-transmit waveguides 206. The pass-through signals are then output from the local output ports 215 to the local neighbor nodes (e.g., nodes (2, 1), (3, 1), (N, 1)).

For global communications from the local node (e.g., node (1, 1)) to its global twin node (e.g., nodes (1, 2)), one wavelength is assigned to transmit signals destined for the global twin node from the local node and a plurality of wavelengths are assigned to transmit pass-through signals destined for local neighbor nodes (e.g., nodes (2, 2), (3, 2), (M, 2)) of the global twin node (e.g., nodes (1, 2)). As a non-limiting example, λ1 of λ1-λN at a global output port 220 is assigned for transmitting signals destined for the global twin node (e.g., nodes (1, 2)) from the local node (e.g., node (1, 1)) while λ2-λN at a global output port 220 are assigned for transmitting pass-through signals that pass through the global twin node (e.g., nodes (1, 2)) and destined for local neighbor nodes (e.g., nodes (2, 2), (3, 2), (N, 2)) of the global twin node (e.g., nodes (1, 2)).

For local direct communications to local neighbor nodes, such as communications between the nodes in the same column/group in FIG. 1, a different wavelength is assigned to a different local neighbor node. As a non-limiting example, referring to FIG. 2, λ1 is assigned to communications between the local node (e.g., node (1, 1)) and a first local neighbor node (e.g., node (2, 1)) coupled to the local-transmit waveguide 206-1; λ2 is assigned to communications between the local node and a second local neighbor node (e.g., node (3, 1)) coupled to the local-transmit waveguide 206-2; and λ(N−1) is assigned to communications between the local node and a (N−1) local neighbor node (e.g., node (N, 1)) coupled to the local-transmit waveguide 206-n. These local direct communications are multiplexed with the pass-through signals on the respective local-transmit waveguides 206 and are output from the local output ports 215 to the local neighbor nodes.

Each local-receive waveguide 224 is coupled to a local input port 226 to receive signals of different wavelengths (e.g., λ1-λN) from a local neighbor node. Signals of one of the wavelengths is assigned for local direct communications between the local node (e.g., node (1, 1)) and a particular local neighbor node (e.g., node (2, 1)). Signals of the remaining wavelengths are assigned for communications from the global twin nodes (e.g., nodes (2, 2), (2, 3), (2, M)) of the particular local neighbor node (e.g., node (2, 1)) to the local node (e.g., node (1, 1)).

The photonic circuit 200 is connected to local neighbor nodes and global twin nodes through its global input ports 212, global output ports 220, local output ports 215, and local input ports 226. For example, the global input ports 212 and the global output ports 220 may each include a connector (nor shown) that linked to fibers/waveguides 240. Similarly, the local output ports 215 and the local input ports 226 may each include a connector (nor shown) that linked to fibers/waveguides 242.

The specific wavelength assignments as illustrated in FIG. 2 are provided as a non-limiting example. Other wavelength assignments are feasible. In some embodiments, each of the wavelength assignments may be a wavelength group comprising multiple wavelengths. The wavelength groups may be used to scale bandwidth for a node to communicate with another node.

With these technique, each node 104 of network 100 can be equipped with a single photonic circuit 200 to handle both intragroup and intergroup communications with other nodes 104 in the network 100. The photonic circuit 200 can be manufactured with known semiconductor processing so that it can be compact, energy-efficient, and powerful. Advantages of the techniques also include significantly reducing optical connectors and fibers within each node. In some embodiments, the techniques enables 5 times reduction in fibers/cables across the nodes, resulting in significantly lower cost and higher density system solutions.

Figure 3:
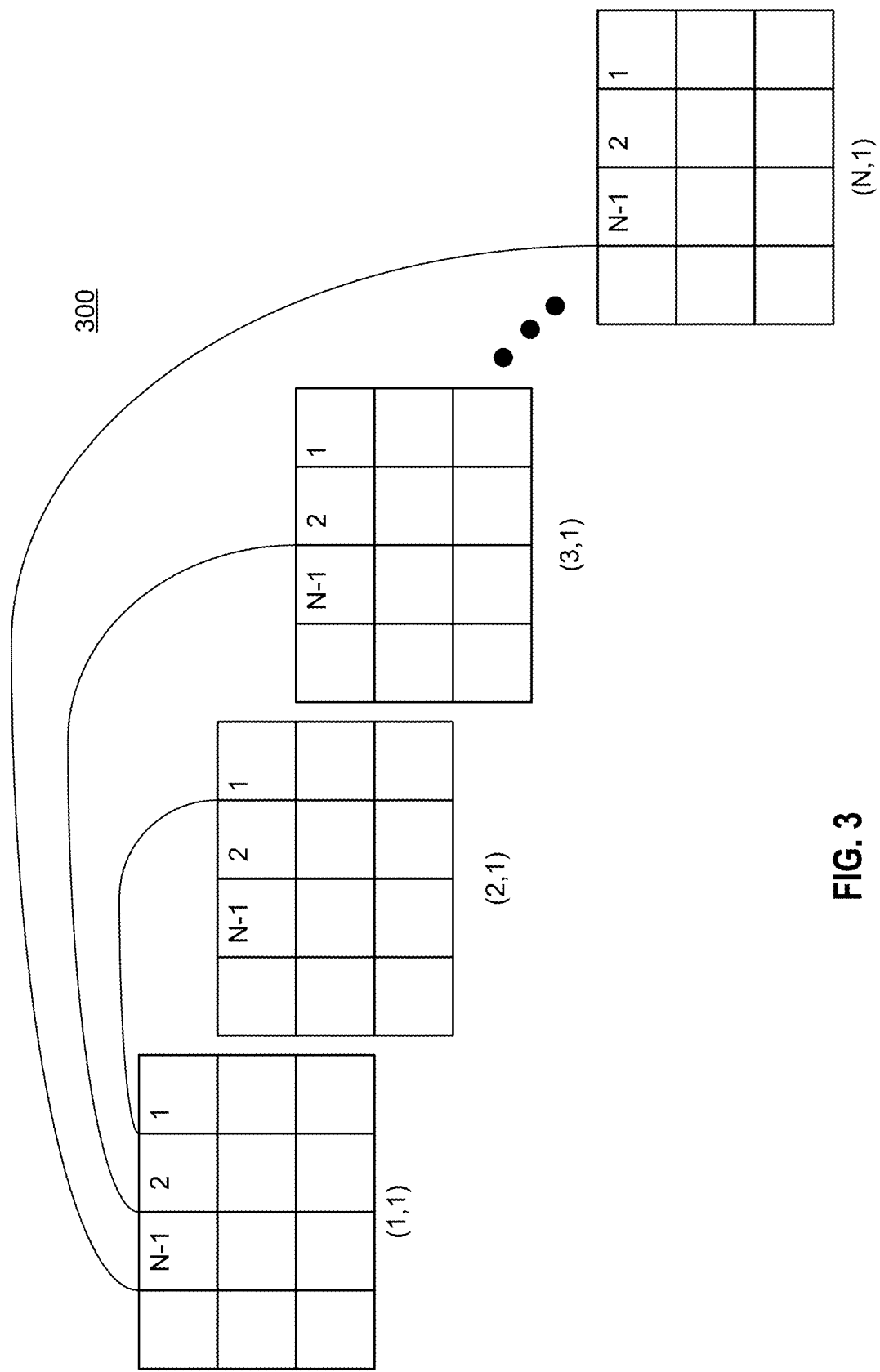
FIG. 3 is a diagram illustrating connections between local nodes of a group according to one embodiment.

FIG. 3 is a diagram illustrating connections between local nodes of a group 300 according to one embodiment. The group 300 includes nodes (1, 1), (2, 1), (3, 1) ... (N, 1). Each of the nodes has a plurality of local connection ports 1, 2 ... (N−1) each connected to a local-transmit waveguide (e.g., the local-transmit waveguide 206 of FIG. 2). Consistent with the techniques disclosed herein, each of the nodes has a direct link to each of all other nodes in the group 300. FIG. 3 shows partial connections of all of those direct links. For example, port 1 of node (1, 1) is directly connected to port 1 of the node (2, 1); port 2 of node (1, 1) is directly connected to port 2 of the node (3, 1); and port (N−1) of node (1, 1) is directly connected to port (N−1) of the node (N, 1). These links may be embodied in optical connectors and cables.

Figure 4:
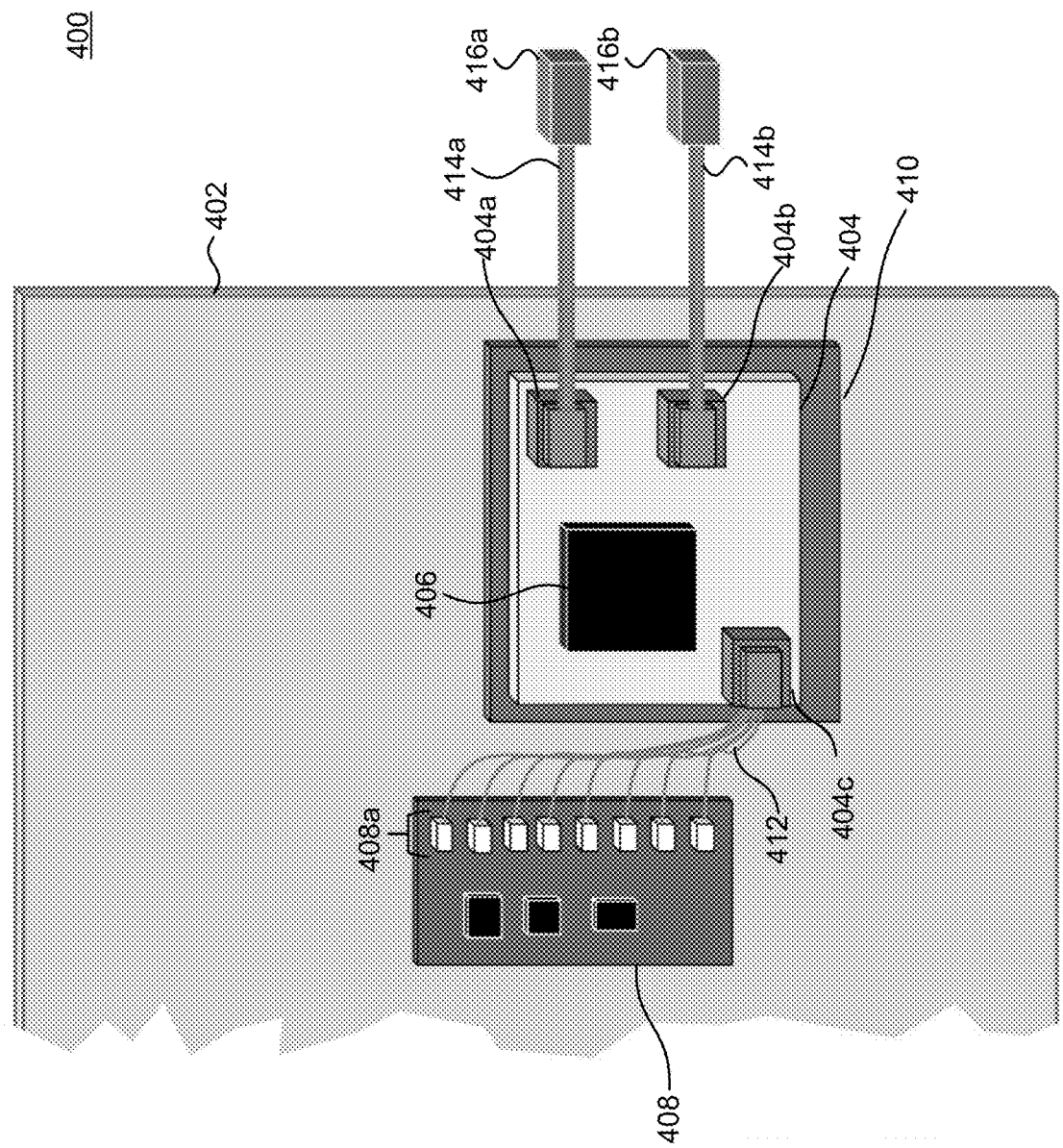
FIG. 4 is a diagram illustrating an implementation of a photonic node consistent with an example embodiment.

FIG. 4 is a diagram illustrating an implementation of a photonic node 400 consistent with an example embodiment. The photonic node 400 includes a system board 402, a photonic die 404, and an electronic die 406 disposed on the photonic die 404, and a light-source assembly 408. In some embodiments, the photonic die 404 may be provided on a substrate 410 that interfaces the photonic die 404 and the system board 402. The system board 402 may be a printed circuit board that can provide support for mounting various components of the node 400. The substrate 410 may be an organic or glass substrate. The photonic die 404 is a semiconductor die that includes a photonic circuit similar to the photonic circuit 200 of FIG. 2. The photonic die 404 further includes connectors 404a-c and interfaces to the electronic die 406. The electronic die 406 is a semiconductor die that includes system interface logic and transmitter/receiver electronics to interface to the photonic die 404. The electronic die 406 may be integrated with photonic die 404 using die-level package technologies or other semiconductor packaging techniques. The light source assembly 408 comprises laser light sources, control logic, and power supplies to provide power and light source to the photonic die 404. The light source assembly 408 also includes connectors 408a that are connected to optical cables/waveguides 412. The other end of the optical cables/waveguides 412 is connected to the connector 404c on the photonic die 404. The connectors 404a and 404b are optical connectors. One (e.g., optical connector 404a) of optical connectors 404a and 404b is connected to an optical cable 414a that provides global links, while the other optical connector (e.g., optical connector 404b) is connected to an optical cable 414b that provides local links. In some embodiments, the optical cables 414a and 414b may be connected to blindmate connectors 416a and 416b.

Figures 5A, 5B:
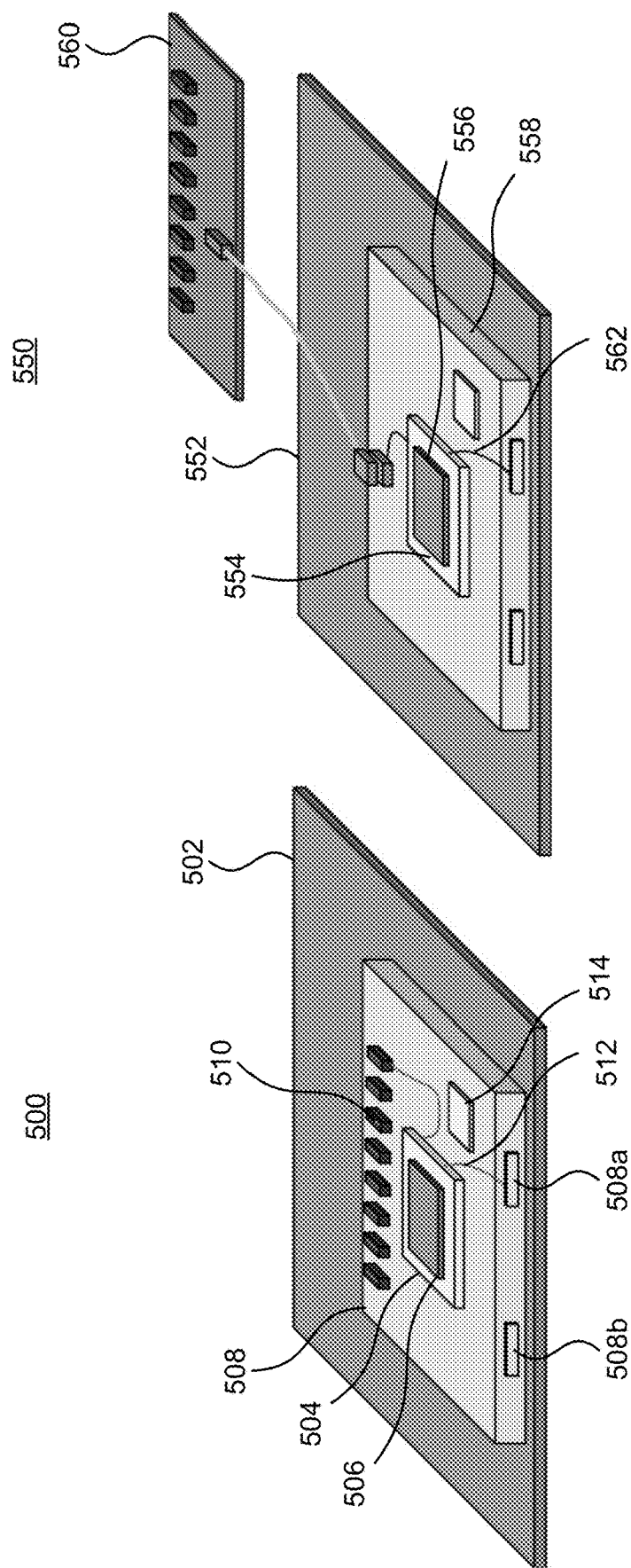
FIG. 5A is a diagram illustrating another implementation of a photonic node consistent with an example embodiment.
FIG. 5B is a diagram illustrating another implementation of a photonic node consistent with an example embodiment.

FIG. 5A is a diagram illustrating another implementation of a photonic node 500 consistent with an example embodiment. The photonic node 500 includes a system board 502, a photonic die 504, and an electronic die 506 disposed on the photonic die 504, a glass block 508, and light sources 510. The system board 502, the photonic die 504, and the electronic die 506 are similar to the system board 402, the photonic die 404, and the electronic die 406, and will not be further described. The glass block 508 has integrated waveguides and connector structures to guide light emitted from the light sources 510 to the photonic die 504. For example, glass block 508 may include optical connectors 508a and 508b to receive one or more embedded waveguides 512 between the photonic die 504 and the optical connectors 508a and 508b. The waveguides 512 are embedded in the glass block 508 to facilitate transmission of light. The glass block 508 may also provide support for mounting the light sources 510 and other electrical and/or photonic components 514 of the photonic node 500. For example, component 514 may be one or more of a power regulator, a power converter, a signal conditioner, a management controller, etc.

FIG. 5B is a diagram illustrating another implementation of a photonic node 550 consistent with an example embodiment. The photonic node 550 includes a system board 552, a photonic die 554, and an electronic die 556 disposed on the photonic die 554, a glass block 558, a light source assembly 560, and embedded waveguides 562. The photonic node 550 is similar to the photonic node 500 except that the glass block 558 provides an additional connector for connection between the photonic die 554 and the light source assembly 560, and that the light sources 510 of the photonic node 500 are replaced by the light source assembly 560.

Figure 6:
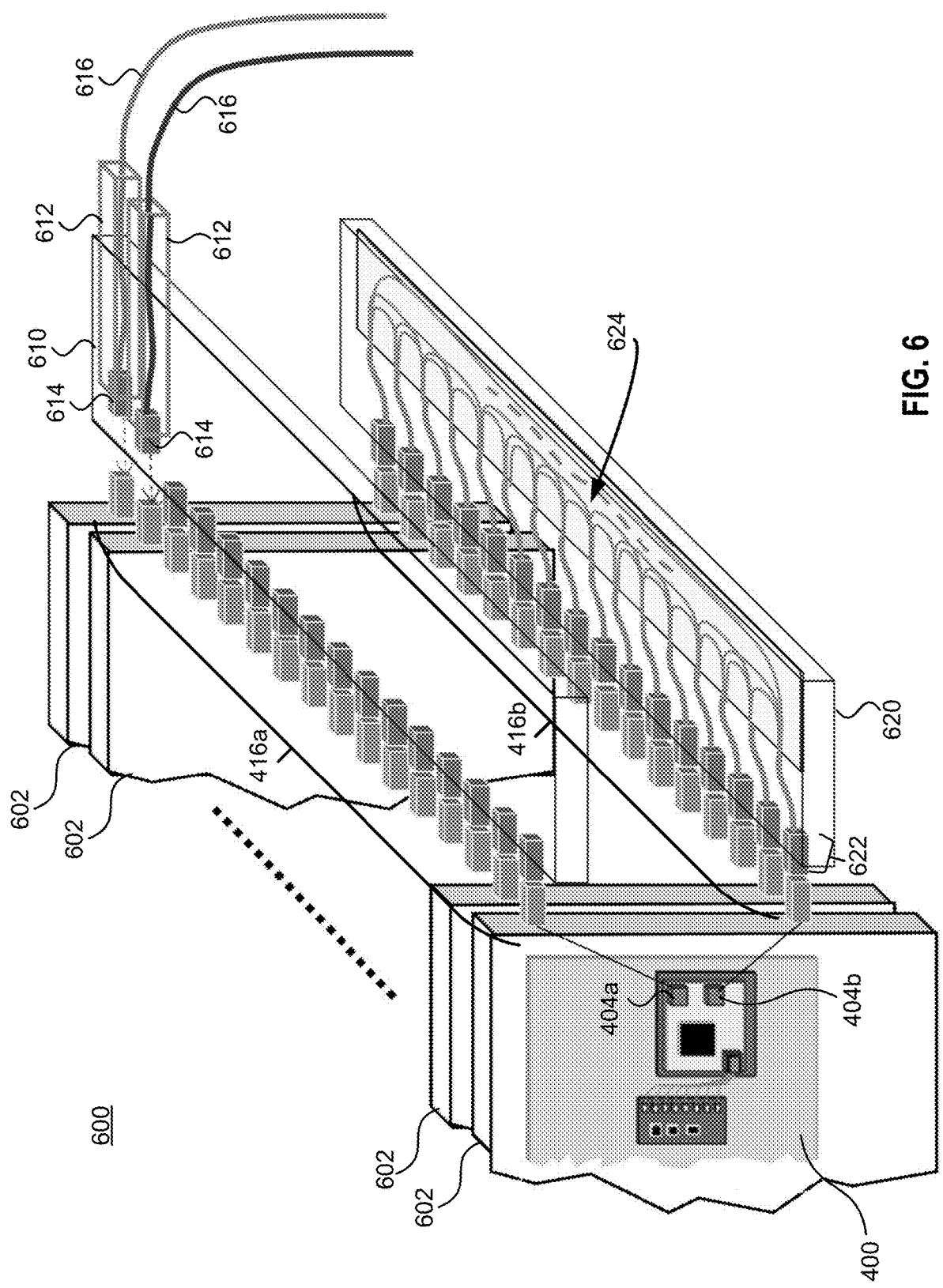
FIG. 6 is a diagram illustrating structures and configurations of a system having a group of local nodes consistent with an example embodiment.

FIG. 6 is a diagram illustrating structures and configurations of a system 600 having a group of local nodes 602 consistent with an example embodiment. Each of the local nodes 602 may be one of the nodes 400, 500, or 550. As a non-limiting example, in FIG. 6, each of the local nodes 602 is the node 400 illustrated in FIG. 4. The local nodes 602 belong to a single group and are in juxtaposition with each other to save space. The local nodes 602 may be enclosed in a chassis (not shown) as a unit. Each of the local node 602 has an optical connector 404a connecting, for example, global links to a blindmate connector 416a for global communication to one or more external groups. Each of the blindmate connectors 416a may be connected with an Independently installable modular backplane segment (global link tray) 610. The backplane segment/tray 610 includes blindmate assemblies 612 where each has a floating mechanism for an optical blindmate connector 614 and accommodates an optical cable 616. The blindmate assemblies 612 provide convenience to not require another optical connector stage on the global link tray 610 to all-to-all connections with other global link trays (not shown) to connect to global twin nodes.

Each of the local node 602 also has an optical connector 404b connecting, for example, local links to a blindmate connector 416b for local communications to local neighbor nodes. Each of the blindmate connectors 416b may be connected with local single-stage fibers in a horizontal backplane/tray 620 that includes connectors 622 and a fiber shuffle 624 to connect to other local neighbor nodes 602. The fiber shuffle 624 includes fibers that enable all-to-all local connections.

Figure 7:
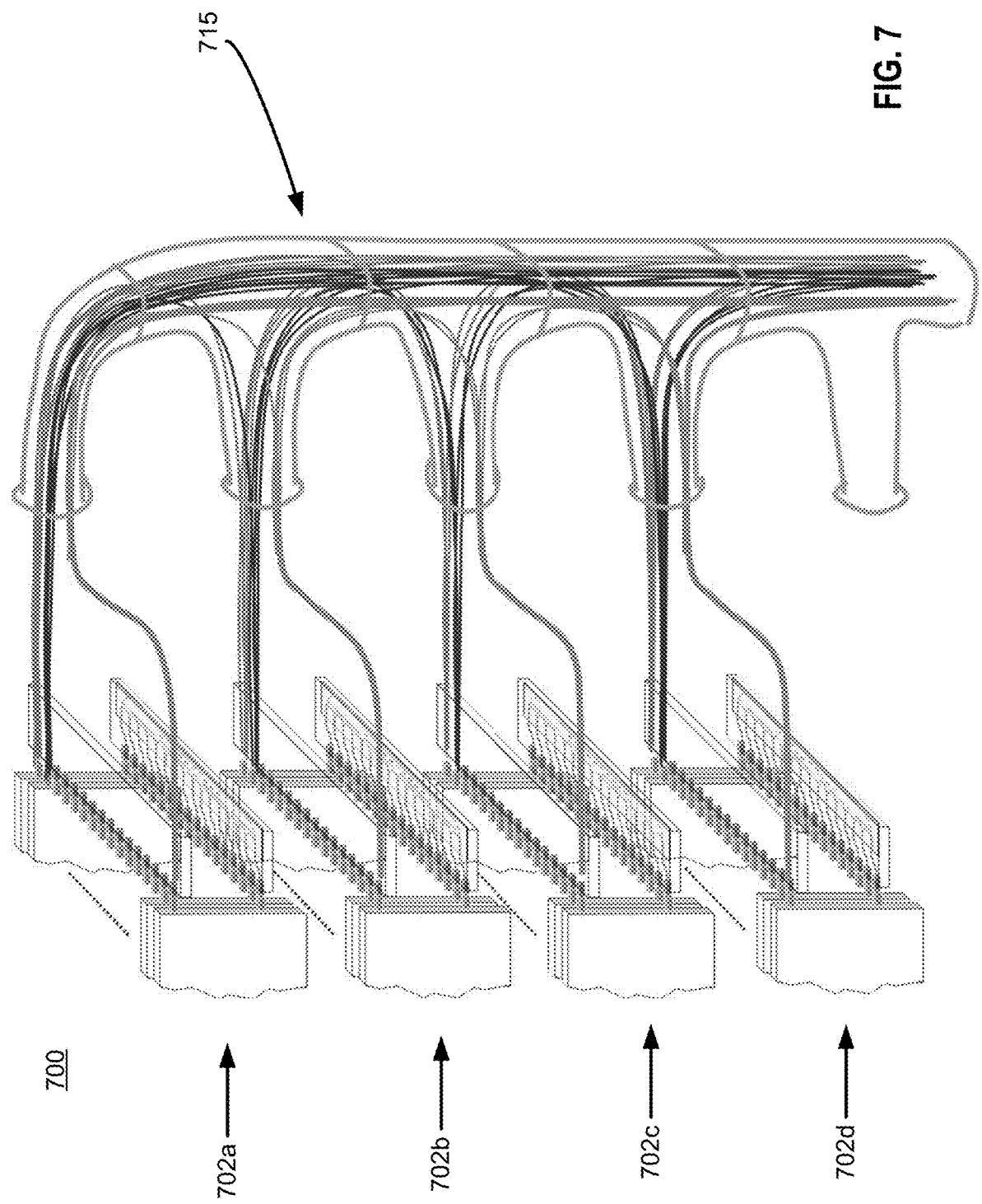
FIG. 7 is a diagram illustrating structures and configurations of a network consistent with an example embodiment.

FIG. 7 is a diagram illustrating structures and configurations of a network 700 consistent with an example embodiment. The network 700 includes a plurality of systems/groups 702a-d. Each of the systems 702a-d is similar to the system 600 of FIG. 6 and includes multiple local nodes. Each of the systems 702a-d can be enclosed with a chassis (not shown) as a group. The global communications among the systems 702a-d are enabled by the optical cable assembly 715. In some embodiments, the optical cable assembly 715 may include global single-stage fibers disposed in a vertical rackplane (e.g., along rear frame of a server rack).

In summary, the techniques disclosed herein provide network solutions for reduced optical connectors and fibers by means of a photonic circuit, such as the photonic circuit 200 of FIG. 2. Consistent with the disclosed techniques, a system node includes a wavelength-division multiplexing (WDM) degree converter using a photonic crossbar (e.g., photonic crossbar (PXB) 210 of FIG. 2) configured to route/redirect pass-through signals to local neighbor nodes. Disclosed techniques provide a fabric topology with two dimensions for local links and global links, respectively, where each dimension may be a Cartesian coordinate axis that can enable dimensionally All-to-All connections. In some embodiments, Quad-Node-Loop routing in the fabric uses symmetric wavelengths (for local direct link transmit and receive) where high WDM order is used for local and global links. The network includes reconfigurable orthogonally-connected simplex-array or duplex-array connectors for all-to-all connections in local links and global links. In some embodiments, direct-blindmate segments are introduced to enable single-stage global link connections. The solution includes a single-chip silicon photonic node that may be disposed on a glass block with integrated connector structures for local links and global links, co-packaged with light sources and an electronic die to eliminate intra-node fibers.

As disclosed herein, the network of photonic nodes interconnected with optical connectors and fibers are protocol agnostic. No protocol port-specifics, such as link training, need to be comprehended by the photonic nodes since MRFs and waveguides in pass-through nodes and fibers are physical transport media for the modulated wavelengths.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality.

In common usage, the term "or" should always be construed in the inclusive sense unless the exclusive sense is specifically indicated or logically necessary. The exclusive sense of "or" is specifically indicated when, for example, the term "or" is paired with the term "either," as in "either A or B." As another example, the exclusive sense may also be specifically indicated by appending "exclusive" or "but not both" after the list of items, as in "A or B, exclusively" and "A and B, but not both." Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A photonic circuit, comprising:
a substrate;
a plurality of first light waveguides disposed on the substrate, the first light waveguides extending in a first direction;
a plurality of second light waveguides disposed on the substrate, the second light waveguides extending in a second direction such that each of the first light waveguides has an intersection with each of the second light waveguides;
a plurality of first micro-ring resonators disposed on the substrate; and
a plurality of second micro-ring resonators, each of the second micro-ring resonators being disposed proximate to a different input port of each of the first light waveguides and each of the second micro-ring resonators being coupled to a photodetector,
wherein each of the intersections is provided with a first micro-ring resonator of the plurality of first micro-ring resonators, each first micro-ring resonator being configured to route signals of a respective wavelength from one of the light waveguides at the intersection to another light waveguide at the intersection,
wherein each of the first micro-ring resonators corresponding to one of the first light waveguides is configured to route a different wavelength relative to the other first micro-ring resonators corresponding to the first light waveguide, and
wherein each of the first micro-ring resonators corresponding to one of the second light waveguides is configured to route a different wavelength relative to the other first micro-ring resonators corresponding to the second light waveguide.

2. The photonic circuit of claim 1, wherein:
each of the first light waveguides is coupled to an input port that is connected to a node of an external group;
each of the second light waveguides is coupled to an output port that is connected to a node of a local group; and
each of the first micro-ring resonators is configured to route signals of a respective wavelength from one of the first light waveguides at an intersection to one of the second light waveguides at the intersection.

3. The photonic circuit of claim 2, further comprising:
a plurality of third light waveguides disposed on the substrate, the third light waveguides extending in a direction parallel to the first direction, wherein each of the third light waveguides is coupled to a first light source configured to emit multiple wavelengths; and
a plurality of first light modulators disposed adjacent to each of the third light waveguides on the substrate, wherein each of the first light modulators is configured to modulate a different wavelength.

4. The photonic circuit of claim 3, wherein each of the third light waveguides is coupled to an output port that is connected to a node of an external group.

5. The photonic circuit of claim 2, further comprising:
a plurality of receiving light waveguides disposed on the substrate, each of the receiving light waveguides having a first portion and a second portion, the first portion extending parallel to the second light waveguides and the second portion extending parallel to the first light waveguides.

6. The photonic circuit of claim 5, further comprising:
a plurality of third micro-ring resonators disposed on the substrate and adjacent to each of the second portions of the receiving light waveguides, wherein each of the third micro-ring resonators is configured to extract a different wavelength.

7. The photonic circuit of claim 6, further comprising a plurality of second photodetectors each coupled to one of the third micro-ring resonators.

8. The photonic circuit of claim 1, further comprising a fourth light waveguide extending in the first direction, wherein the fourth light waveguide is disposed adjacent to ends of the second light waveguides and is coupled to a second light source.

9. The photonic circuit of claim 8, further comprising a second light modulator disposed between an end of each of the second light waveguides and the fourth light waveguide, wherein each of the second light modulators is configured to modulate a different wavelength.

10. A node comprising:
a photonic die having a photonic circuit; and
an electronic die disposed on the photonic die, wherein the electronic die includes transmitting electronics and receiver electronics to interface with the photonic die, wherein the photonic circuit comprises:
  a substrate;
  a plurality of first light waveguides disposed on the substrate, the first light waveguides extending in a first direction;
  a plurality of second light waveguides disposed on the substrate, the second light waveguides extending in a second such that each of the first light waveguides has an intersection with each of the second light waveguides;
  a plurality of first micro-ring resonators disposed on the substrate; and
  a plurality of second micro-ring resonators, each of the second micro-ring resonators being disposed proximate to a different input port of each of the first light waveguides and each of the second micro-ring resonators being coupled to a photodetector,
    wherein each of the intersections is provided with a first micro-ring resonator of plurality of the first micro-ring resonators, each first micro-ring resonator being configured to route signals of a respective wavelength from one of the light waveguides at the intersection to another light waveguide at the intersection,
    wherein each of the first micro-ring resonators corresponding to one of the first light waveguides is configured to route a different wavelength relative to the other first micro-ring resonators corresponding to the first light waveguide, and
    wherein each of the first micro-ring resonators corresponding to one of the second light waveguides is configured to route a different wavelength relative to the other first micro-ring resonators corresponding to the second light waveguide.

11. The node of claim 10, wherein:
each of the first light waveguides is coupled to an input port that is connected to a node of an external group;
each of the second light waveguides is coupled to an output port that is connected to a node of a local group; and
each of the first micro-ring resonators is configured to route signals of a respective wavelength from one of the first light waveguides at an intersection to one of the second light waveguides at the intersection.

12. The node of claim 11, wherein the photonic circuit further comprises:
  a plurality of third light waveguides disposed on the substrate, the third light waveguides extending in a direction parallel to the first direction, wherein each of the third light waveguides is coupled to a first light source configured to emit multiple wavelengths; and
  a plurality of first light modulators disposed adjacent to each of the third light waveguides on the substrate, wherein each of the first light modulators is configured to modulate a different wavelength.

13. The node of claim 12, wherein each of the third light waveguides is coupled to an output port that is connected to a node of an external group.

14. The node of claim 11, wherein the photonic circuit further comprises:
  a plurality of receiving light waveguides disposed on the substrate, each of the receiving light waveguides having a first portion and a second portion, the first portion extending parallel to the second light waveguides and the second portion extending parallel to the first light waveguides.

15. The node of claim 14, wherein the photonic circuit further comprises:
  a plurality of third micro-ring resonators disposed on the substrate and adjacent to each of the second portions of the receiving light waveguides, wherein each of the third micro-ring resonators is configured to extract a different wavelength.

16. The node of claim 15, wherein the photonic circuit further comprises a plurality of second photodetectors each coupled to one of the third micro-ring resonators.

17. The node of claim 10, wherein the photonic circuit further comprises a fourth light waveguide extending in the first direction, wherein the fourth light waveguide is disposed adjacent to ends of the second light waveguides and is coupled to a second light source.

18. The node of claim 17, wherein the photonic circuit further comprises a second light modulator disposed between an end of each of the second light waveguides and the fourth light waveguide, wherein each of the second light modulators is configured to modulate a different wavelength.

* * * * *